United States Patent [19]
Yanagisawa

[11] Patent Number: 5,355,744
[45] Date of Patent: Oct. 18, 1994

[54] TWO DIMENSIONAL DRIVE SYSTEM

[76] Inventor: Ken Yanagisawa, c/o Kabushiki Kaisha Mechanic Sekkei Jimusho, 5175-1, Ooaza Toyoshina, Toyoshina-machi, Minamiazumi-gun, Nagano-ken, Japan

[21] Appl. No.: 59,364

[22] Filed: May 11, 1993

[30] Foreign Application Priority Data

May 12, 1992 [JP] Japan ................... 4-146654

[51] Int. Cl.$^5$ .................................. G05G 11/00
[52] U.S. Cl. ...................... 74/479 PH; 74/89.13; 33/1 M; 108/20; 108/143; 248/661
[58] Field of Search .......... 74/479 PH, 89.13, 89.15; 33/1 M; 108/20, 143; 248/661

[56] References Cited

U.S. PATENT DOCUMENTS

| | | | |
|---|---|---|---|
| 4,409,860 | 10/1983 | Moriyama et al. | 108/143 |
| 4,729,536 | 3/1988 | Scala | 108/143 |
| 4,781,127 | 11/1988 | Conley | 108/143 |
| 4,856,197 | 8/1989 | Auer et al. | 33/1 M |
| 4,995,277 | 2/1991 | Yanagisawa | 74/471 X |
| 5,165,296 | 11/1992 | Yanagisawa | 108/143 |
| 5,253,400 | 10/1993 | Conachen | 74/479 PH |
| 5,279,178 | 1/1994 | Yanagisawa | 74/479 PH |

FOREIGN PATENT DOCUMENTS

| | | | |
|---|---|---|---|
| 169890 | 5/1951 | Austria | 74/471 X |
| 4226072 | 2/1993 | Fed. Rep. of Germany | 33/1 M |
| 3213233 | 9/1991 | Japan . | |

Primary Examiner—John T. Kwon

[57] ABSTRACT

In the two dimensional drive system of the present invention, each end of a first X-shaft is connected to each first Y-guide, and the first X-shaft is capable of moving along the first Y-guides. Each end of a second X-shaft is connected to each second Y-guide, and the second X-shaft is capable of moving along the second Y-guides. Each end of a Y-shaft is connected to each X-guide, and the Y-shaft is capable of moving along the X-guides. A first moving body always locates at a cross point of the first X-shaft and the Y-shaft, and is capable of moving thereon. A second moving body always locates at a cross point of the second X-shaft and the Y-shaft, and is capable of moving thereon. An X-drive mechanism moves the Y-shaft along the X-guides. A first Y-drive mechanism moves the first X-shaft along the first Y-guides. A second Y-drive mechanism moves the second X-shaft along the second Y-guides. With these structures, one drive mechanism for moving the shaft is capable of simultaneously moving the moving bodies in the same direction.

8 Claims, 2 Drawing Sheets

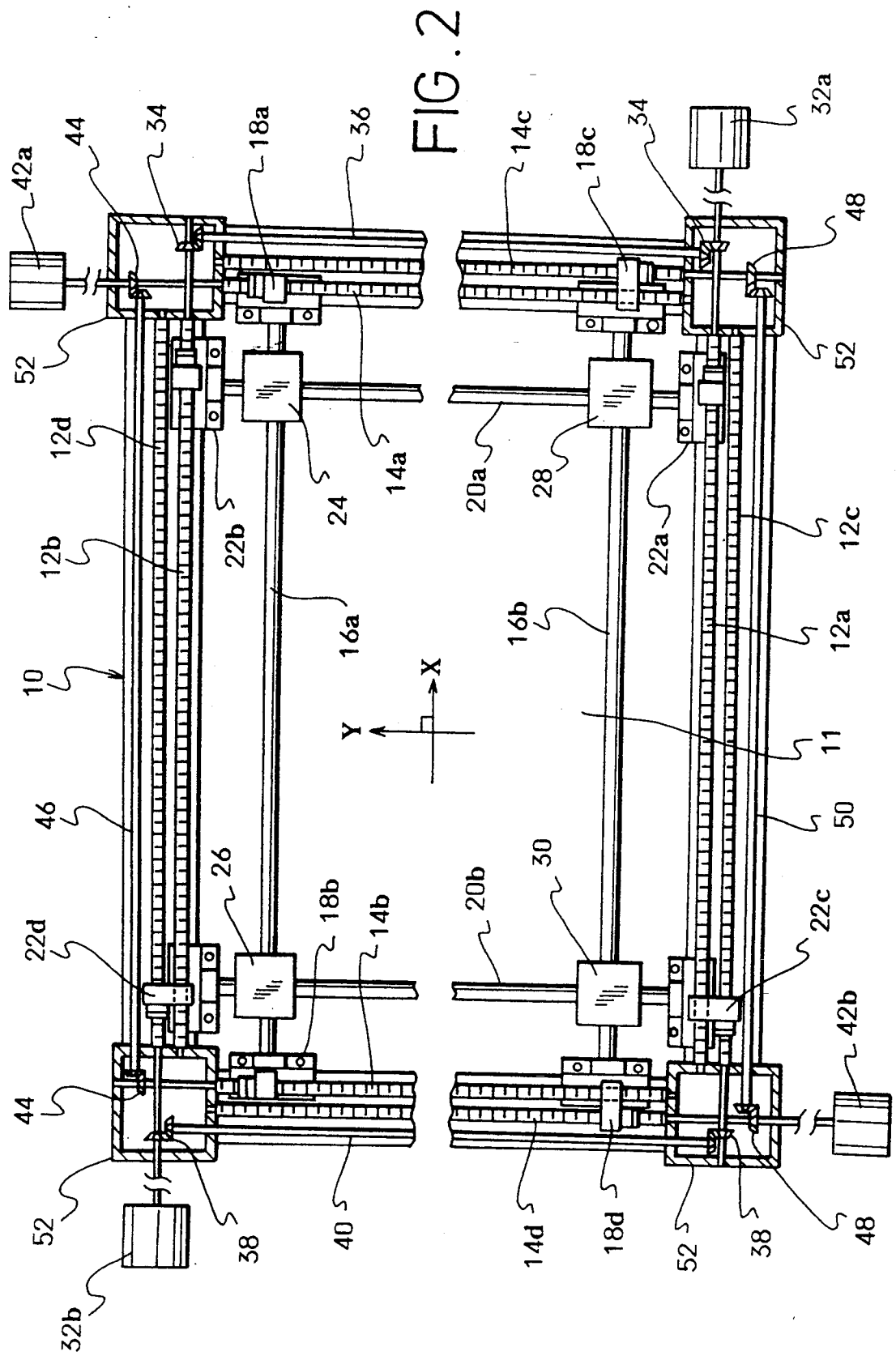

TWO DIMENSIONAL DRIVE SYSTEM

BACKGROUND OF THE INVENTION

The present invention relates to a two dimensional drive system, more precisely relates to a two dimensional drive system, which is capable of moving a plurality of moving bodies.

An example of two dimensional drive systems, which are capable of moving a plurality of moving bodies, was disclosed in the Japanese Patent Kokai Gazette No. 3-213233.

The conventional two dimensional drive system has a plurality of sub-drive systems, each of which is capable of moving one moving body in a plane. The sub-drive systems are arranged in a plane. Each sub-drive system has an X-drive mechanism for moving the moving body in an X-direction and a Y-drive mechanism for moving the moving body in a Y-direction perpendicular to the X-direction. The X-drive mechanism and the Y-drive mechanism can drive the moving body independently.

However, the conventional two dimensional drive system has following disadvantages.

The drive system must have one X-drive mechanism and one Y-drive mechanism for each moving body. In case of moving four moving bodies, for example, the drive system must have eight drive mechanisms. Therefore, the drive system has a complex structure, and manufacturing cost must be higher. In actual uses, four moving bodies are seldom driven independently, so a lower cost drive system is required now, even if it has some limitations to the movement of the moving bodies.

SUMMARY OF THE INVENTION

An object of the invention is to provide a two dimensional drive system, which is capable of moving a plurality of moving bodies, having a simple structure.

To achieve the object, the two dimensional drive of the present invention has following basic structures. A pair of X-guides are arranged parallel to an X-direction. A pair of first Y-guides are arranged parallel to a Y-direction perpendicular to the X-direction, a pair of second Y-guides are arranged parallel to the first Y-guides. A first X-shaft is arranged parallel to the X-guides, each end of the first X-shaft is connected to each of the first Y-guides, and the first X-shaft is capable of moving along the first Y-guides. A second X-shaft is arranged parallel to the X-guides, each end off the second X-shaft is connected to each of the second Y-guides, and the second X-shaft is capable of moving along the second Y-guides. A Y-shaft is arranged parallel to the first Y-guides and the second Y-guides, each end of the Y-shaft is connected to each of the X-guides, and the Y-shaft is capable of moving along the X-guides. A first moving body always locates at a cross point of the first X-shaft and the Y-shaft, and is capable of moving on the first X-shaft and the Y-shaft. A second moving body always locates at a cross point of the second X-shaft and the Y-shaft, and is capable of moving on the second X-shaft and the Y-shaft. An X-drive mechanism moves the Y-shaft along the X-guides. A first Y-drive mechanism moves the first X-shaft along the first Y-guides. A second Y-drive mechanism moves the second X-shaft along the second Y-guides.

Especially in case of four moving bodies, the two dimensional drive system has following structures. A pair of first X-guides are arranged parallel to an X-direction. A pair of second X-guides are arranged parallel to the first X-guides. A pair of first Y-guides are arranged parallel to a Y-direction perpendicular to the X-direction. A pair of second Y-guides are arranged parallel to the first Y-guides. A first X-shaft are arranged parallel to the first X-guides and the second X-guides, each end of the first X-shaft is connected to each of the first Y-guides, and the first X-shaft is capable of moving along the first Y-guides. A second X-shaft is arranged parallel to the first X-guides and the second X-guides, each end of the second X-shaft is connected to each of the second Y-guides, and the second X-shaft is capable of moving along the second Y-guides. A first Y-shaft is arranged parallel to the first Y-guides and the second Y-guides, each end of the first Y-shaft is connected to each of the first X-guides, the first Y-shaft is capable of moving along the first X-guides. A second Y-shaft is arranged parallel to the first Y-guides and the second Y-guides, each end of the second Y-shaft is connected to each of the second X-guides, and the second Y-shaft is capable of moving along the second X-guides. A first moving body always locates at a cross point of the first X-shaft and the first Y-shaft, and is capable of moving on the first X-shaft and the first Y-shaft. A second moving body always locates at a cross point of the first X-shaft and the second Y-shaft, and is capable of moving on the first X-shaft and the second Y-shaft. A third moving body always locates at a cross point of the second X-shaft and the first Y-shaft, and is capable of moving on the second X-shaft and the first Y-shaft. A fourth moving body always locates at a cross point of the second X-shaft and the second Y-shaft, and is capable of moving on the second X-shaft and the second Y-shaft. A first X-drive mechanism moves the first Y-shaft along the first X-guides. A second X-drive mechanism moves the second Y-shaft along the second X-guides. A first Y-drive mechanism moves the first X-shaft along the first Y-guides. A second Y-drive mechanism moves the second X-shaft along the second Y-guides.

In the two dimensional drive system of the present invention, a plurality of the moving bodies are movably provided on one shaft, so that one drive mechanism for moving the shaft is capable of simultaneously moving the moving bodies in the same direction. Therefore, four moving bodies, for example, can be moved by four drive mechanisms. In comparison with said conventional two dimensional drive system, the two dimensional drive system of the present invention has simpler structure and its manufacturing cost can be reduced.

BRIEF DESCRIPTION OF THE DRAWINGS

An embodiment of the present invention will now be described by way of an example and with reference to the accompanying drawings, in which:

FIG. 2 is a plan sectional view of the embodiment.

DETAILED DESCRIPTION OF A PREFERRED EMBODIMENT

Figure 1:
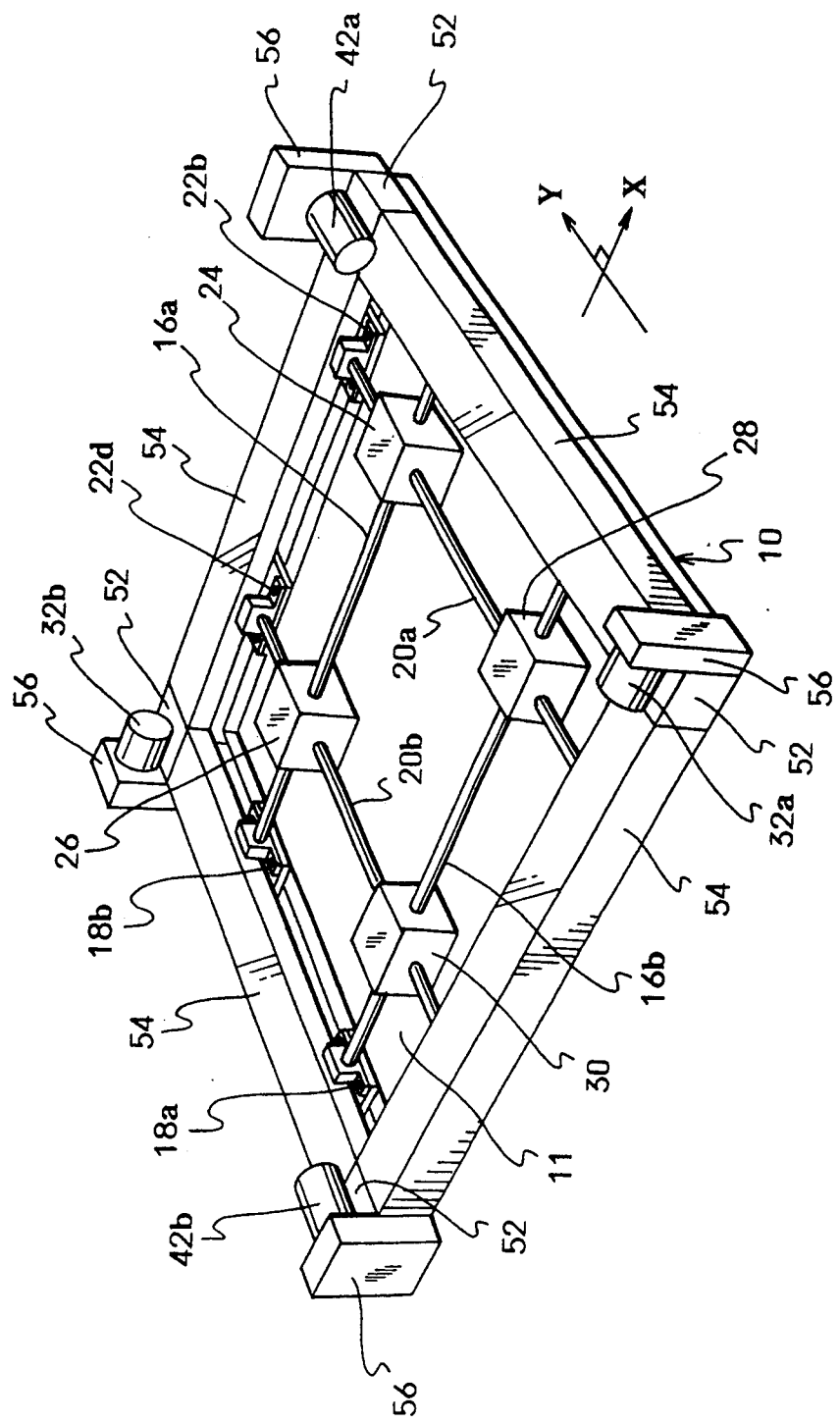
FIG. 1 is a perspective view of an embodiment of the two dimensional drive system of the present invention.

A preferred embodiment of the present invention will now be described in detail with reference to the accompanying drawings.

FIG. 1 is a perspective view of the present embodiment, and FIG. 2 is a plan sectional view thereof.

In FIGS. 1 and 2, a frame 10 encloses a rectangular space 11.

A pair of X-ball screws 12a and 12b, which are an example of first X-guides, are provided on the frame 10. The X-ball screws 12a and 12b are arranged parallel to an X-direction.

A pair of X-ball screws 12c and 12d, which are an example of second X-guides, are provided on the frame 10. The X-ball screws 12c and 12d are arranged parallel to the X-ball screws 12a and 12b.

A pair of Y-ball screws 14a and 14b, which are an example of first Y-guides, are provided on the frame 10. The Y-ball screws 14a and 14b are arranged parallel to a Y-direction perpendicular to the X-direction.

A pair of Y-ball screws 14c and 14d, which are an example of second Y-guides, are provided on the frame 10. The Y-ball screws 14c and 14d are arranged parallel to the Y-ball screws 14a and 14b.

A shaft 16a is a first X-shaft. The shaft 16a is arranged parallel to the X-ball screws 12a, 12b, 12c and 12d. Each end of the shaft 16a is respectively fixed to travellers 18a and 18b, which are an example of moving blocks. The travellers 18a and 18b are respectively screwed to the Y-ball screws 14a and 14b. With this structure, when the Y-ball screws 14a and 14b rotate in the same direction at the same revolution speed, the travellers 18a and 18b moves in the Y-direction along the Y-ball screws 14a and 14b.

A shaft 16b is a second X-shaft. The shaft 16b is arranged parallel to the X-ball screws 12a, 12b, 12c and 12d. Each end of the shaft 16b is respectively fixed to travellers 18c and 18d, which are an example of moving blocks. The travellers 18c and 18d are respectively screwed to the Y-ball screws 14c and 14d. With this structure, when the Y-ball screws 14c and 14d rotate in the same direction at the same revolution speed, the travellers 18c and 18d moves in the Y-direction along the Y-ball screws 14c and 14d. Note that, the Y-ball screws 14a and 14b are pierced through the travellers 18c and 18d without contact.

A shaft 20a is a first Y-shaft, The shaft 20a is arranged parallel to the Y-ball screws 14a, 14b, 14c and 14d. Each end of the shaft 20a is respectively fixed to travellers 22a 22b, which are an example of moving blocks, The travellers 22a and 22b are respectively screwed to the X-ball screws 12a and 12b. With this structure, when the X-ball screws 12a and 12b rotate in the same direction at the same revolution speed, the travellers 22a and 22b moves in the X-direction along the X-ball screws 12a and 12b.

A shaft 20b is a second Y-shaft, The shaft 20b is arranged parallel to the Y-ball screws 14a, 14b, 14c and 14d. Each end of the shaft 20b is respectively fixed to travellers 22c and 22d, which are an example of moving blocks. The travellers 22c and 22d are respectively screwed to the X-ball screws 12c and 12d. With this structure, when the X-ball screws 12c and 12d rotate in the same direction at the same revolution speed, the travellers 22c and 22d moves in the X-direction along the X-ball screws 12c and 12d. Note that, the X-ball screws 12a and 12b are pierced through the travellers 22c and 22d without contact.

A slider 24 is an example of a first moving body. The shafts 16a and 20a are pierced through the slider 24. Tools, robot heads, measuring equipments, works, etc. can be mounted on the slider 24. The slider 24 always locates at a cross point of the shafts 16a and 20a. The slider 24 is capable of moving on the shafts 16a and 20a.

A slider 26 is an example of a second moving body. The shafts 16a and 20b are pierced through the slider 26. Tools, robot heads, measuring equipments, works, etc. can be mounted on the slider 26. The slider 26 always locates at a cross point of the shafts 16a and 20b. The slider 26 is capable of moving on the shafts 16a and 20b.

A slider 28 is an example of a third moving body. The shafts 16b and 20a are pierced through the slider 28. Tools, robot heads, measuring equipments, works, etc. can be mounted on the slider 28. The slider 28 always locates at a cross point of the shafts 16b and 20a. The slider 28 is capable of moving on the shafts 16b and 20a.

A slider 30 is an example of a third moving body. The shafts 16b and 20b are pierced through the slider 30. Tools, robot heads, measuring equipments, works, etc. can be mounted on the slider 30. The slider 30 always locates at a cross point of the shafts 16b and 20b. The slider 30 is capable of moving on the shafts 16b and 20b.

A DC servo motor 32a rotates the X-ball screws 12a and 12b in the same direction at the same revolution speed. The X-ball screw 12a is directly rotated by the servo motor 32a; the X-ball screw 12b is rotated thereby via bevel gears 34 and a metal shaft 36. A set of first X-drive mechanism for moving the shaft 20a in the X-direction along the X-ball screws 12a and 12b includes the servo motor 32a, the bevel gears 34 and the metal shaft 36.

A DC servo motor 32b rotates the X-ball screws 12c and 12d in the same direction at the same revolution speed. The X-ball screw 12d is directly rotated by the servo motor 32b; the X-ball screw 12c is rotated thereby via bevel gears 38 and a metal shaft 40. A set of second X-drive mechanism for moving the shaft 20b in the X-direction along the X-ball screws 12c and 12d includes the servo motor 32b, the bevel gears 38 and the metal shaft 40.

A DC servo motor 42a rotates the Y-ball screws 14a and 14b in the same direction at the same revolution speed. The Y-ball screw 14a is directly rotated by the servo motor 42a; the Y-ball screw 14b is rotated thereby via bevel gears 44 and a metal shaft 46. A set of first Y-drive mechanism for moving the shaft 16a in the Y-direction along the Y-ball screws 14a and 14b includes the servo motor 42a, the bevel gears 44 and the metal shaft 46.

A DC servo motor 42b rotates the Y-ball screws 14c and 14d in the same direction at the same revolution speed. The Y-ball screw 14d is directly rotated by the servo motor 42b; the Y-ball screw 14c is rotated thereby via bevel gears 48 and a metal shaft 50. A set of second Y-drive mechanism for moving the shaft 16b in the Y-direction along the Y-ball screws 14c and 14d includes the servo motor 42b, the bevel gears 48 and the metal shaft 50.

Note that, the bevel gears 34, 38, 44 and 48 are respectively accommodated in gear boxes 52, which are provided at each corner of the frame 10. End sections of the ball screws 12a, 12b, 12c, 12d, 14a, 14b, 14c and 14d and the metal shafts 36, 40, 46 and 50 are rotatably supported by the gear boxes 52. Furthermore, the servo motors 32a, 32b, 42a and 42b are, as clearly shown in FIG. 1, provided above frame covers 54, and connected to the ball screws 12a, 12b, 12c, 12d, 14a, 14b, 14c and 14d and the metal shafts 36, 40, 46 and 50 by timing belts (not shown), which are respectively accommodated in belt casings 56, so as to rotate them.

With above described structures, the slider 24 can be moved in the X-Y directions by controlling the servo motor 32a and 42a; the slider 26 can be moved in the X-Y directions by controlling the servo motor 32b and 42a; the slider 28 can be moved in the X-Y directions by controlling the servo motor 32a and 42b; the slider 30 can be moved in the X-Y directions by controlling the servo motor 32b and 42b. Locations of the each slider 24, 26, 28 and 30 can be controlled by selecting combinations of the servo motors 32a, 32b, 42a and 42b. Note that, in the present embodiment, the control of the servo motors 32a, 32b, 42a and 42b are executed by a control unit (not shown), which includes a microprocessor.

In the present embodiment, the ball screws 12a, 12b, 12c, 12d, 14a, 14b, 14c and 14d are used as the first X-guides, the second X-guides, the first Y-guides and the second Y-guides, but said guides are not limited to ball screws. Timing belts, air cylinder units, etc. can be used instead of the ball screws 12a, 12b, 12c, 12d, 14a, 14b, 14c and 14d so as to move the shafts 16a, 16b, 20a and 20b in the X-Y directions.

In the embodiment, the drive system has four sliders (moving bodies), but the number of the sliders may be two (except cases of the sliders 24 and 30 and the sliders 26 and 28) or three. Furthermore, a plurality of the drive systems may be piled so as to increase the number of the sliders: five or more.

The invention may be embodied in other specific forms without departing from the spirit or essential characteristics thereof. The present embodiment. is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A two dimensional drive system, comprising:
    a pair of X-guides being arranged parallel to an X-direction;
    a pair of first Y-guides being arranged parallel to a Y-direction perpendicular to the X-direction;
    a pair of second Y-guides being arranged parallel to said first Y-guides;
    a first X-shaft being arranged parallel to said X-guides, each end of said first X-shaft being connected to each of said first, Y-guides, said first X-shaft being capable of moving along said first Y-guides;
    a second X-shaft being arranged parallel to said X-guides, each end of said second X-shaft being connected to each of said second Y-guides, said second X-shaft being capable of moving along said second Y-guides;
    a Y-shaft being arranged parallel to said first Y-guides and said second Y-guides, each end of said Y-shaft being connected to each of said X-guides, said Y-shaft being capable of moving along said X-guides;
    a first moving body always locating at a cross point of said first X-shaft and said Y-shaft, said first moving body being capable of moving on said first X-shaft and said Y-shaft;
    a second moving body always locating at a cross point of said second X-shaft and said Y-shaft, said second moving body being capable of moving on said second X-shaft and said Y-shaft;
    an X-drive mechanism for moving said Y-shaft along said X-guides;
    a first Y-drive mechanism for moving said first X-shaft along said first Y-guides; and
    a second Y-drive mechanism for moving said second X-shaft along said second Y-guides.

2. The two dimensional drive system according to claim 1,
    wherein said X-guides, said first Y-guides and said second Y-guides are ball screws to which each end of said first X-shaft, said second X-shaft and said Y-shaft is respectively screwed, and each of said X-drive mechanism, said first Y-mechanism and said second Y-mechanism includes a servo motor.

3. The two dimensional drive system according to claim 2,
    wherein each of said X-drive mechanism, said first Y-mechanism and said second Y-mechanism directly drives one of said ball screws by said servo motor, and drives the other ball screw via a transmitting mechanism including a metal shaft and bevel gears.

4. The two dimensional drive system according to claim 2,
    wherein each end of said first X-shaft, said second X-shaft and said Y-shaft is connected to moving blocks, which are respectively screwed to said ball screws.

5. A two dimensional drive system, comprising:
    a pair of first X-guides being arranged parallel to an X-direction;
    a pair of second X-guides being arranged parallel to said first X-guides;
    a pair of first Y-guides being arranged parallel to a Y-direction perpendicular to the X-direction;
    a pair of second Y-guides being arranged parallel to said first Y-guides;
    a first X-shaft being arranged parallel to said first X-guides and said second X-guides, each end of said first X-shaft being connected to each of said first Y-guides, said first X-shaft being capable of moving along said first Y-guides;
    a second X-shaft being arranged parallel to said first X-guides and said second X-guides, each end of said second X-shaft being connected to each of said second Y-guides, said second X-shaft being capable of moving along said second Y-guides;
    a first Y-shaft being arranged parallel to said first Y-guides and said second Y-guides, each end of said first Y-shaft being connected to each of said first X-guides, said first Y-shaft being capable of moving along said first X-guides;
    a second Y-shaft being arranged parallel to said first Y-guides and said second Y-guides, each end of said second Y-shaft being connected to each of said second X-guides, said second Y-shaft being capable of moving along said second X-guides;
    a first moving body always locating at a cross point of said first X-shaft and said first Y-shaft, said first moving body being capable of moving on said first X-shaft and said first Y-shaft;
    a second moving body always locating at a cross point of said first X-shaft and said second Y-shaft, said second moving body being capable of moving on said first X-shaft and said second Y-shaft;
    a third moving body always locating at a cross point of said second X-shaft and said first Y-shaft, said third moving body being capable of moving on said second X-shaft and said first Y-shaft;

a fourth moving body always locating at a cross point of said second X-shaft and said second Y-shaft, said fourth moving body being capable of moving on said second X-shaft and said second Y-shaft;

a first X-drive mechanism for moving said first Y-shaft along said first X-guides;

a second X-drive mechanism for moving said second Y-shaft along said second X-guides;

a first Y-drive mechanism for moving said first X-shaft along said first Y-guides; and a second Y-drive mechanism for moving said second X-shaft along said second Y-guides.

6. The two dimensional drive system according to claim 5, wherein said first X-guides, said second X-guides, said first Y-guides and said second Y-guides are ball screws to which each end of said first X-shaft, said second X-shaft, said first Y-shaft and said second Y-shaft is respectively screwed, and each of said first X-drive mechanism, said second X-drive mechanism, said first Y-mechanism and said second Y-mechanism includes a servo motor.

7. The two dimensional drive system according to claim 6, wherein each of said first X-drive mechanism, said second X-drive mechanism, said first Y-mechanism and said second Y-mechanism directly drives one of said ball screws by said servo motor, and drives the other ball screw via a transmitting mechanism including a metal shaft and bevel gears.

8. The two dimensional drive system according to claim 6, wherein each end of said first X-shaft, said second X-shaft, said first Y-shaft and said second Y-shaft is connected to moving blocks, which are respectively screwed to said ball screws.

* * * * *